US009219932B2

(12) United States Patent
Steyer et al.

(10) Patent No.: US 9,219,932 B2
(45) Date of Patent: Dec. 22, 2015

(54) METHOD FOR USING A REMOTE CONTROL FOR A PAYMENT TRANSACTION AND ASSOCIATED DEVICE

(71) Applicant: Thomson Licensing, Issy de Moulineaux (FR)

(72) Inventors: Jean-Marie Steyer, Cesson Sevigne (FR); Ludovic Jeanne, Cesson Sevigne (FR); Didier Roustide, Cesson Sevigne (FR)

(73) Assignee: Thomson Licensing (FR)

( * ) Notice: Subject to any disclaimer, the term of this patent is extended or adjusted under 35 U.S.C. 154(b) by 115 days.

(21) Appl. No.: 13/717,757

(22) Filed: Dec. 18, 2012

(65) Prior Publication Data

US 2013/0167167 A1 Jun. 27, 2013

(30) Foreign Application Priority Data

Dec. 21, 2011 (FR) .................................... 11 62193

(51) Int. Cl.
*H04N 7/16* (2011.01)
*H04N 21/2543* (2011.01)
*G08C 17/02* (2006.01)
*G06Q 20/32* (2012.01)

(52) U.S. Cl.
CPC ....... *H04N 21/2543* (2013.01); *G06Q 20/3278* (2013.01); *G08C 17/02* (2013.01)

(58) Field of Classification Search
CPC H04N 21/2543; H04N 7/17318; H04N 7/165
USPC .................. 725/87–120, 5, 80, 81, 131–134, 725/139–142, 151–153; 348/734; 455/456.1–456.6, 414.1; 705/26.1
See application file for complete search history.

(56) References Cited

U.S. PATENT DOCUMENTS

| 8,198,988 | B2 * | 6/2012 | Hardacker et al. ......... 340/12.51 |
| 8,572,257 | B2 * | 10/2013 | Dua .............................. 709/227 |
| 8,583,494 | B2 * | 11/2013 | Fisher ............................ 705/16 |
| 8,667,541 | B1 * | 3/2014 | Zhu ................................ 725/59 |

(Continued)

FOREIGN PATENT DOCUMENTS

| CN | 101242482 | 8/2008 |
| EP | 1959410 | 8/2008 |

(Continued)

OTHER PUBLICATIONS

French Search report dated Apr 19, 2012.

(Continued)

*Primary Examiner* — Annan Shang
(74) *Attorney, Agent, or Firm* — Jack Schwartz & Associates, PLLC

(57) ABSTRACT

Remote control device of a data receiver, the data being representative of an audiovisual content, the data receiver receiving information relating to payment of an object and data representative of the object, the remote control device comprising means of configuring the data receiver useful for processing data representative of an audiovisual content, remote control device being characterized in that it comprises a user interface for initializing a payment transaction, a first wireless interface for receiving information useful for payment of the object and a second wireless interface for transmitting payment information with a remote payment unit.

6 Claims, 5 Drawing Sheets

(56) References Cited

U.S. PATENT DOCUMENTS

| | | | |
|---|---|---|---|
| 8,887,212 B2* | 11/2014 | Dua | 725/81 |
| 8,928,452 B2* | 1/2015 | Kim et al. | 340/4.3 |
| 8,930,492 B2* | 1/2015 | Brown et al. | 709/217 |
| 2006/0271963 A1 | 11/2006 | Mangu et al. | |
| 2008/0134255 A1* | 6/2008 | Ferris et al. | 725/62 |
| 2008/0231762 A1* | 9/2008 | Hardacker et al. | 348/734 |
| 2009/0075591 A1* | 3/2009 | Murdoch et al. | 455/41.1 |
| 2009/0096610 A1* | 4/2009 | Thorn | 340/572.4 |
| 2009/0128392 A1* | 5/2009 | Hardacker et al. | 341/175 |
| 2009/0144203 A1 | 6/2009 | Hurry | |
| 2009/0172765 A1 | 7/2009 | Kim | |
| 2009/0282102 A1* | 11/2009 | Geurts et al. | 709/204 |
| 2009/0327111 A1 | 12/2009 | Bulawa et al. | |
| 2010/0075666 A1* | 3/2010 | Garner | 455/426.1 |
| 2011/0060653 A1* | 3/2011 | King et al. | 705/14.58 |
| 2011/0246276 A1* | 10/2011 | Peters et al. | 705/14.24 |
| 2012/0204206 A1* | 8/2012 | Gutierrez Prieto et al. | 725/31 |
| 2013/0073672 A1* | 3/2013 | Ayed | 709/217 |
| 2013/0148024 A1* | 6/2013 | Shin et al. | 348/552 |
| 2013/0198786 A1* | 8/2013 | Cook et al. | 725/81 |

FOREIGN PATENT DOCUMENTS

| | | |
|---|---|---|
| GB | 2370456 | 6/2002 |
| WO | WO03005270 | 1/2003 |
| WO | WO2007135598 | 11/2007 |
| WO | WO2011/015597 | 2/2011 |

OTHER PUBLICATIONS

Standard ECMA-340 Near Filed Communication Interface and Protocol (NFCIP-1), 3rd Edition, Jun. 2013.
International Standard "Identification Cards-Contactless Integrated Circuit(s) Cards-Proximity Cards—Part 2: Radio Frequency Power and Signal Interface", ISO/IEC 14443-2:2001(E), First Edition, Jul. 1, 2001.
International Standard "Identification Cards-Contactless Integrated Circuit(s) Cards-Proximity Cards—Part 3: Initialization and Anticollision", ISO/IEC 14443-3:2001(E), First Edition, Feb. 1, 2001.
International Standard "Identification Cards-Contactless Integrated Circuit(s) Cards-Proximity Cards—Part 4: Transmission Protocol", ISO/IEC 14443-4:2001(E), First Edition, Feb. 1, 2001.
International Standard "Identification Cards-Contactless Integrated Circuit(s) Cards-Proximity Cards—Part 1: Physical Characteristics", ISO/IEC FCD 14443-1, ISO/IEC JTC/SC17 N 1355.

* cited by examiner

METHOD FOR USING A REMOTE CONTROL FOR A PAYMENT TRANSACTION AND ASSOCIATED DEVICE

This application claims the benefit, under 35 U.S.C. §119 of FR Patent Application 1162193, filed 21 Dec. 2011.

1. DOMAIN OF THE INVENTION

The invention relates to the domain of data receivers providing marketing functions and offering the purchase of objects (goods or services) and more precisely to the payment transaction at the time of such a purchase.

2. PRIOR ART

The multiplicity of domestic or professional equipment interconnected through the intermediary of communication networks has enabled a growing development of commerce through the intermediary of these media. It is therefore possible to purchase goods or services from a data receiving device such as a computer, a personal assistant or an item of television receiving equipment connected to remote servers through the intermediary of the Internet, for example. Payment at the time of such a transaction can be made by electronic means according to several methods. A payment terminal can be incorporated into an item of equipment in order to effect a payment by bank card when connected to a remote transaction server. Other solutions rely on billing via an operator who provides an Internet connection or via secure payment requiring the buyer's bank details to be entered.

More recently, transaction modes have emerged enabling payment from an item of telecommunication equipment such as a smartphone equipped with NFC (Near Field Communication) technology. The telephone acts as a payment unit. Many smartphones are equipped with this technology. The telephones include embedded circuits which enable encrypted information to be sent over short distances. A specific circuit in the telephone contains payment information similar to that stored in the user's bank card. A payment transaction can then be effected by simply bringing the smartphone comprising the NFC technology into proximity with a suitable payment terminal. This removes the requirement for the use of the traditional bank card.

There are many examples of the use of NFC technology: a mobile telephone can be connected to a computer to download a file, a device can send pictures to an electronic personal assistant or a television set can exchange data with a telephone. In addition, access control, ticketing and interactive terminals of all types are markets in which NFC technology is used. Purchases can be made by simply moving within proximity of a terminal. It is possible to purchase a product sold at a vending machine by bringing a mobile telephone compatible with NFC technology within proximity of the vending machine glass, for example.

NFC technology is mainly fitted in electronic products by using reduced-size application-specific integrated circuits.

The circuits are designed to enable secure payment. The embedded encoding and encryption are designed to ensure maximum security for transactions and to enable sustained growth in electronic commerce. Compact portable devices such as smartphones can be used as virtual wallets with which it is possible to make purchases by using secure payment transactions.

The standards relating to NFC technology are;
NFCIP-1 (ISO/CEI 18092) which defines the communication interface and protocol between two peripheral devices compatible with NFC technology,
ISO/CEI 14443-1 to ISO/CEI 14443-4 which define communication with contactless integrated circuits, and
NDEF (NFC Data Exchange Format) which defines the data exchange format.

In a context in which items of equipment such as a modem/router connected to the Internet on one hand and to a local network on the other, an audiovisual programme receiver-decoder and a telecommunication device capable of being connected to a remote payment transaction server coexist, it is possible to purchase a good or a service using one of these items of equipment (or a module of one of these items of equipment) as an electronic payment terminal.

Today it is possible to make payments by associating a smartphone equipped with NFC technology with an item of equipment comprising the payment terminal functions compatible with NFC.

The broadcasting of information enabling a user to make a purchase offered through the intermediary of an audiovisual programme decoder-receiver has today become commonplace. It is possible, for example, that while watching an audiovisual programme, an application associated with receiving the programme permits the user to purchase an object (good or service) described in the course of recovery of the audiovisual programme from its receiver. The application executed on the receiver at the same time as the recovery of the programme offers the user the purchase. The user confirms the purchase and initialises the payment procedure, if necessary by using a receiver remote control device, for example.

It is however necessary to be able to establish a link between the data defining the purchase object, received by the receiver-decoder equipment and the user's smartphone equipped with NFC technology.

The data relating to the purchase object and received on a data receiver are for example the object reference, its supplier, its price and the payment destination.

The user-specific data useful for payment of the purchase are for example data representing the user's bank details, included in the smartphone equipped with NFC technology.

It is possible to imagine an item of data receiving equipment such as an audiovisual programme receiver-decoder equipped with NFC technology, and to envisage the receiver-decoder thus equipped then acting as an electronic payment terminal associated with an NFC smartphone to emulate a means of payment (similar to a bank card).

However, NFC technology requires close proximity of the two items of equipment for a transaction. The contact between the items of equipment can be direct or, failing that, the maximum distance is of the order of a few centimeters.

This represents a drawback, as during a purchase offered by a receiver-decoder and in which the payment is effected by using a smartphone for example, the user must then move to the receiver to bring his/her telephone within range. This drawback is all the more significant as the connections between the items of receiving equipment and display equipment (for example a receiver-decoder and a television set) increasingly use wireless connections. The receiver-decoder is in this case quite often concealed and less accessible. Another drawback is that, as the operation requiring the user to move towards the receiver is less straightforward, it tends to reduce the probability of the object being purchased.

3. SUMMARY OF THE INVENTION

The purpose of the invention is to overcome at least one of the drawbacks of the prior art and more specifically to enable a payment transaction between an item of data receiving equipment (such as an audiovisual programme receiver decoder) and a payment unit (such as a smartphone equipped with NFC technology) without having to bring them within a distance of the order of a few centimeters of each other.

More specifically; the invention relates to a remote control device of a data receiver, the data being representative of an audiovisual content, the data receiver receiving information useful for payment of an object and data representative of the object, the remote control device comprising means of configuring the data receiver useful for processing data representative of an audiovisual content, the remote control device comprising:

- a user interface for initialising a payment transaction of said object presented in said audiovisual content,
- a first wireless communication interface for receiving information relating to the payment of the object, from said data receiver,
- a second wireless communication interface for transmitting payment information to a remote payment unit.

According to one embodiment of the invention, the user interface of the remote control device comprises at least one key.

According to a variant, the user interface comprises a touchscreen.

According to one embodiment of the invention, the second remote control device communication interface uses a radio frequency identification method.

According to one embodiment of the invention, the second communication interface of the remote control device is adapted to near field communication between the two items of equipment.

According to one embodiment of the invention, the second interface is compatible with the near field communication NFC standards.

According to one embodiment of the invention, the remote control device comprises means of securing the data transmitted by the first communication interface and the second communication interface.

The invention also relates to a method for transmitting payment information of an object, data representative of the object being received by a data receiving device, the data being representative of an audiovisual content, the information representative of the object comprising payment information, the receiver being controlled by a remote control device, the method comprises in the remote control device, the steps of:

initialising said payment,
receiving payment information from said data receiver,
transmitting payment information to a remote payment unit.

According to one embodiment of the invention, the step of transmitting payment information comprises a step matching the remote control device and the remote payment unit.

According to one embodiment of the invention, the payment unit is contained within a telecommunication device.

According to one embodiment of the invention, a telecommunication device which comprises the payment unit also comprises a smartphone module.

According to one embodiment of the invention, the object offered for sale is a service.

According to one embodiment of the invention, the remote payment unit comprises an electronic payment terminal module.

According to one embodiment of the invention, the payment unit comprises bank account identification data.

4. LIST OF FIGURES

The invention will be better understood, and other specific features and advantages will emerge upon reading the following description, the description making reference to the annexed drawings wherein.

Figure 2:
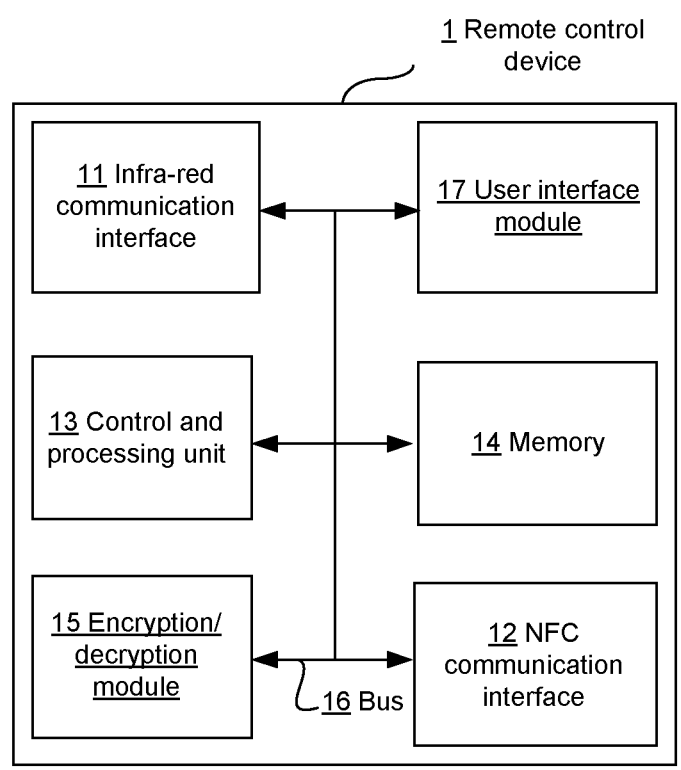
FIG. 2 shows the remote control device shown in FIG. 1 according to a first and a second embodiment of the invention.
Figure 3:
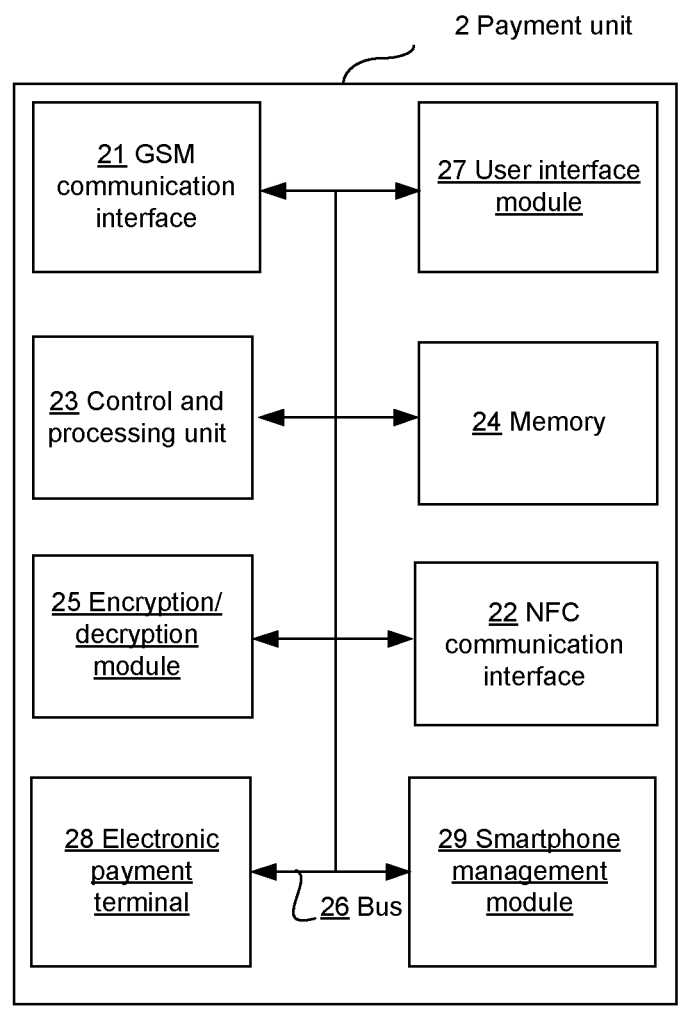
FIG. 3 shows a payment unit according to a first and a second embodiment of the invention.
Figure 4:
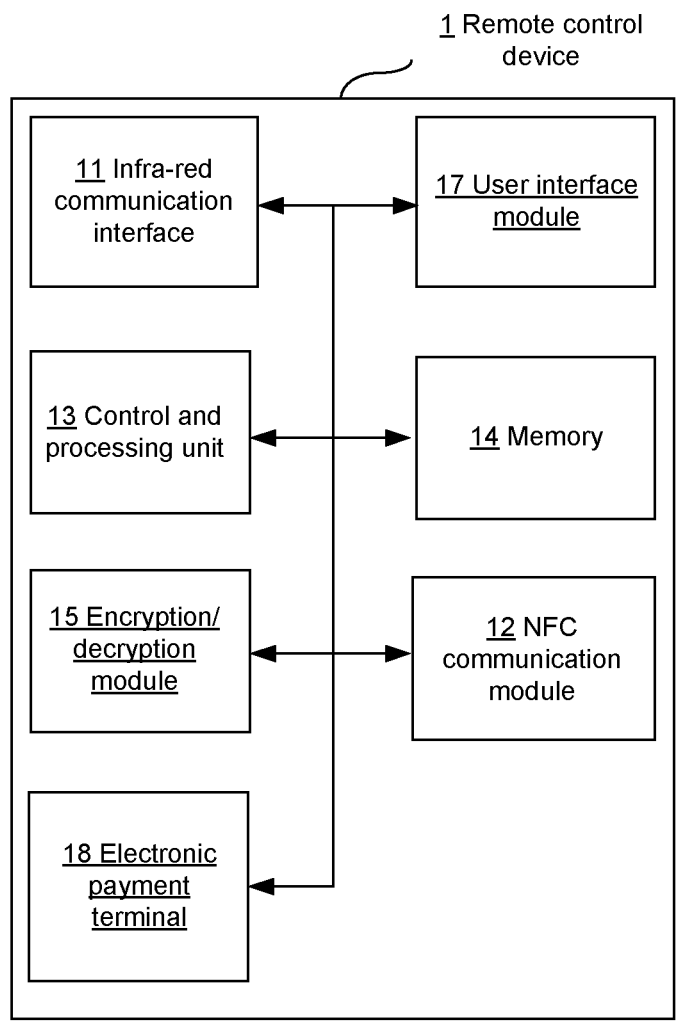
FIG. 4 shows the remote control device shown in FIG. 1 according to the second embodiment of the invention.

In FIGS. 2, 3 and 4, the modules shown are functional units that may or may not correspond to physically distinguishable units. For example, these modules or some of them are grouped together in a single component, or constitute functions of the same software. Conversely, according to other embodiments, some modules are composed of separate physical entities.

5. DETAILED DESCRIPTION OF THE INVENTION

In a general but non-restrictive way, the invention relates to a remote control device of an item of equipment for receiving audiovisual programmes. The control device comprising modules and interfaces enabling payment to be effected for an object whose sale is offered through an item of receiving equipment.

The object sold can be a material good, an intangible object or a service. By intangible object is understood an audiovisual content (a film or a piece of music, for example).

Figure 1:
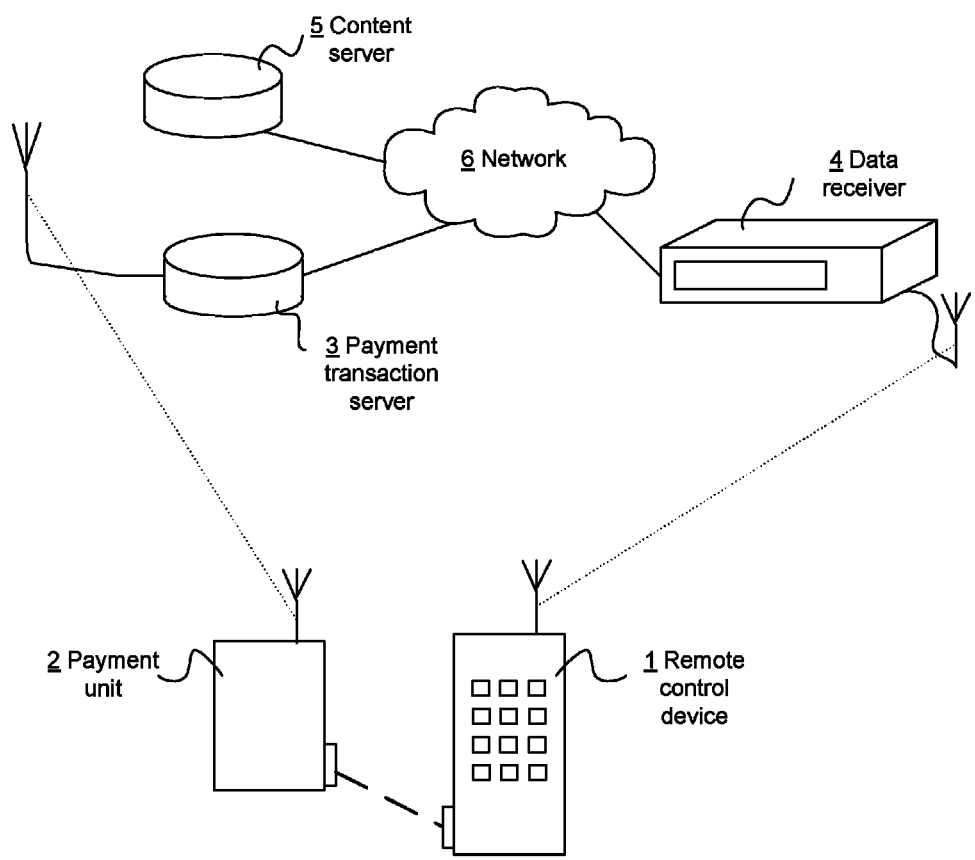
FIG. 1 shows a data transmission system comprising a remote control device and a payment unit according to a first and a second embodiment of the invention.

FIG. 1 shows a data transmission system comprising a content server 5 and a data receiver 4 according to a first embodiment of the invention. The data are transmitted via a bidirectional network 6. The bidirectional network 6 comprises a broadband network (WAN, Wide Area Network) and at least one local network (LAN, Local Area Network). The network 6 is a network as known commonly under the name of the Internet. The network 6 comprises a gateway device for connecting the receiver decoder 4 to the Internet. The gateway device, not shown here, connects the WAN and LAN networks comprised in the network 6. The data receiver 4 is an audiovisual programme receiver-decoder. It enables receipt of content such as for example television programmes, films, music and executable applications. The data receiver 4 is also known as a "set-top box". The contents received and decoded by the data receiver 4 are broadcast from the content server 5 or from several servers similar to the content server 5. The content server comprises storage means, encoders, multiplexers and all the elements useful for data broadcast on a bidirectional broadband network. The content server 5 also enables an operator who has control of it to insert data representative of an object for sale into an audio/video transport stream received by the receiver 4. These data representative of an object for sale are processed by the receiver 4 and enable an object to be offered for sale to the user of the receiver 4 by means of display for example. The receiver 4 is connected to a display device not shown here which, as well as displaying received and decoded audiovisual programmes, enables various information to be displayed (subtitles, OSD (On Screen Display, which indicates display of an image superimposed on the screen), Teletext, graphical windows and photos). The receiver 4 is adapted to display information from data received from the server 5 and by executing specific routines. It comprises a control unit for this purpose. The type of object for sale is for example a material good, such as may be offered during a televised tele-shopping programme but also a catalogue which the user accesses by navigating on Internet sites or an intangible good or a service (an on-demand film, for example).

When the user purchases an object, he/she confirms the purchase by using a remote control device such as the remote control 1 of the receiver 4. The remote control 1 comprises all the standard control functions of the receiver-decoder 4 such as, for example, the instructions for changing the displayed programmes, programming recordings, switching to stand-by mode, controlling volume, or using freeze-frame.

According to the first embodiment of the invention, the remote control comprises two wireless communication interfaces. The first interface enables data exchange with the receiver 4. It supports, amongst other things, the common control functions of the audiovisual programme receiver-decoder. The first wireless interface enables data representative of the object for sale to be received and displayed and the data useful for (or relating to) the object payment to be received. It involves for example an object reference, an object supplier, a price and a payment destination.

When the user of the receiver 4 confirms a purchase, a payment transaction by means of a remote payment unit is offered to the user. According to the first embodiment the payment unit is a communication device such as a smartphone comprising an NFC interface (adapted to communication at short distances) and adapted for the use of the functions described in the set of NFC technology standards. These functions comprise electronic payment and more specifically the function of bank payment terminal, bank card emulation and communication between two items of equipment according to a peer-to-peer mode.

After the user has confirmed his/her purchase, the information representative of the object purchased are transmitted via the receiver 4 to the remote control 1. The channel of communication between the receiver 4 and the remote control 1 is of infra-red type and the data are encrypted before transmission and decrypted on receipt in order to ensure the confidentiality of the transferred data. According to a variant, the transmission channel uses a radio-frequency technology such as for example that described by the Zigbee standard (reference). According to another variant, this interface uses a Bluetooth technology (reference).

The information is then transmitted by the remote control 1 to the payment unit 2 which is a smartphone comprising NFC functions. The communication interface between the remote control 1 and the payment unit 2 is an NFC interface whose physical part is based on the standard.

The payment unit 2 then acts to associate the means of payment (a bank card) and an electronic payment terminal. The payment unit 2 is connected through the intermediary of a GSM network to the payment transaction server 3 and exchanges information according to the electronic payment protocols know to those skilled in the art. The electronic transaction comprises the transmission of the identification of the holder to the transaction server 3 and the payment destination.

Thus the remote control device 1 (the remote control) of the data receiver 4 (the set-top box or receiver-decoder) is adapted to operate as intermediary between the programme receiver 4 and the smartphone 2 and enables a payment transaction to be effected with a remote server 3 by simply bringing the smartphone (which comprises the payment unit 2) into proximity with the remote control 1.

This leads to increased user comfort as even in the case where the receiver 4 is equipped with a communication interface compatible with NFC technology, the user should, in the absence of the remote control 1, bring the smartphone 2 into proximity with the receiver 4 in order to effect the payment transaction.

The payment, thus facilitated by the remote control 1, is possible as the remote control 1 comprises a user interface, a first wireless communication interface and a second communication interface compatible with NFC technology.

The remote control user interface is standard and comprises input keys and a screen (alphanumeric, for example). According to a variant, the user interface is a touchscreen adapted for displaying and entering information FIG. 2 shows the remote control device 1 shown in FIG. 1. This device is the remote control of the data receiver 4 (audiovisual programme receiver-decoder) which, in addition to its ability to execute standard remote control functions (that is to say without wire connection between the remote control 1 and the receiver 4), is adapted to exchange information between the receiver 4 (audiovisual programme receiver-decoder) and the payment unit 2 (a smartphone equipped with NFC technology and a communication interface compatible with NFC). The remote control 1 comprises a bidirectional infra-red communication interface module 11, a bidirectional communication interface module compatible with NFC technology 12, a data control and processing unit 13, a memory 14 and an encryption/decryption module 15. This set of modules is interconnected via an internal bus 16.

FIG. 3 shows a payment unit 2 combined with telecommunication means (a smartphone incorporating functions such as described in the set of NFC standards).

The payment unit 2 compatible with NFC technology can operate as a means of payment (a bank card), a means of payment associated with an electronic payment terminal or a peer-to-peer communication device such as defined in the NFC standardisation documents. These functions can be used simultaneously with the smartphone functions, notably when the payment unit 2 is used as means of payment associated with a payment terminal, in communication with the payment transaction server 3.

According to the embodiment, the exchanges between the transaction server 3 and the payment unit 2 are made via a bidirectional transmission channel specific to smartphone (of GSM, EDGE or 3G type, for example) communications.

The payment unit comprises a GSM communication interface 21 enabling the transmission and receipt of data useful for the telecommunication functions and of data specific to a payment transaction with the payment transaction server 3. All functions specific to the use of the smartphone are carried out via a smartphone management module, under control of a control and processing unit 23. The control and processing unit which comprises a processor stores the data to be processed in a memory module 24. The memory module comprises a volatile memory for executing processes implemented by the control and processing unit and a non-volatile memory for storing all software routines useful for the functions of the payment unit 2 (the functions relating to the payment and the smartphone functions). The payment unit also comprises an NFC bidirectional communication interface module 22 and an encryption and decryption module 24 used for securing data during transmission from and to exterior devices. All interactions with the user are carried out via a user interface module 27 which comprises input elements (for example keys, a keyboard or a touchscreen) and display elements. Finally, when the payment unit is used to effect a payment transaction with the payment transaction server 3, all exchanges specific to the transaction are effected via the electronic payment terminal (EPT) module 28.

When the electronic payment unit 2 is used in a mode which emulates the function of bank payment card, the data used for the purposes of identification are read in the memory module 24. These data, representative of the identity of the holder of the payment unit 2 or of his/her payment details (bank details for example), are encrypted/decrypted via the encryption/decryption module 24 under control of the control and processing unit 23.

When the payment unit 2 is used by combining the functions of bank card emulation and the electronic payment terminal functions, the data relating to the payment transaction are also encrypted/decrypted in order to secure the data exchanges in accordance with the protocol used for the transaction. An example of the purchase of an object according to the embodiment of the invention is described below.

A user of the receiver-decoder 4 watches an audiovisual programme transmitted by the content server 5 and transmitted via the network 6. Data relating to the sale of an object are inserted into the optional fields of the data stream carrying the data representative of the audiovisual programme. The receiver 4 receives information representative of the object for sale and executes a specific routine calling up a display window on the screen of a television set connected to the receiver 4. The display window indicates to the user that he/she can purchase the object offered simply by confirming using the validation key (OK key, for example) of his/her remote control (the remote control enabling the receiver 4 to be controlled remotely). The user confirms he/she wants to buy the object, which has the effect of initialising a payment procedure for the object. Information relating to the payment of the object, also transmitted in the optional fields of the data stream used for broadcasting the audiovisual programme, is then transmitted from the receiver 4 to the remote control device (remote control). These data comprise the object price and the payment recipient. The receiver 4 displays a new window inviting the user to effect the payment by means of a smartphone equipped with NFC technology. The remote control executes, on receipt of the data from receiver-decoder 4, a routine aiming to detect the presence of a payment device compatible with NFC technology. The user brings the smartphone (the payment unit 2) within proximity of the remote control (the remote control device 1) and communication is established according to the NFC protocols. The smartphone informs the user, via the user interface module, of the payment transaction to be effected according to the data relating to the payment received from the remote control (the price and the information representative of the payment recipient). The user confirms the transaction which is then effected between the payment unit 2 and the payment transaction server 3. When the transaction server validates the transaction, it transmits a transaction certificate to the payment unit 2 which it transmits to the remote control. The remote control sends the payment certificate to the receiver 4 through the intermediary of its infra-red communication interface 11. The receiver authorises the object to be supplied (or delivered) to the user. The object can then be supplied immediately in the case of an intangible good (such as a film or a piece of music, for example) or supplied to the user's postal address by using a file establishing a correspondence between the receiving equipment 4 and the user's details. This can be the case when the content server operator or a partner of the operator offers the sale of the object. According to the embodiment, the conformity of the payment transaction is ensured by the payment unit 2. The remote control device 1 of the data receiver 4 serves only to transmit information relating to object payment between the receiver 4 and the payment unit 2. The payment is simplified for the user who does not require to bring his smartphone within proximity of the receiver in order to effect the object payment transaction.

Figure 5:
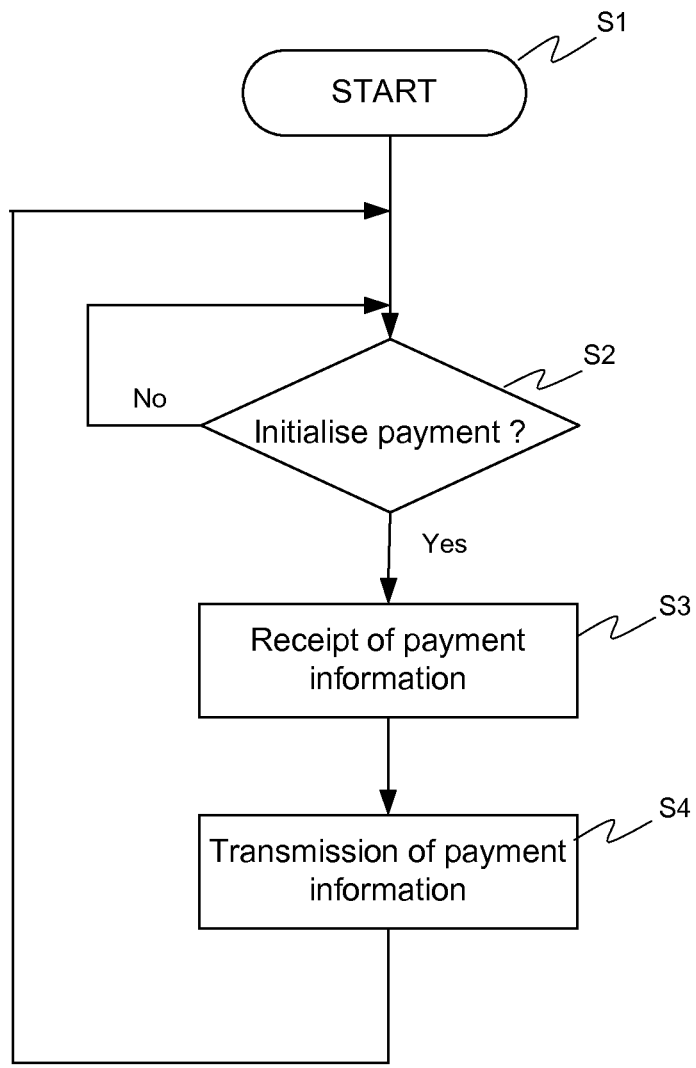
FIG. 5 is a diagram showing the steps of the payment method according to the first embodiment of the invention.

FIG. 5 is a functional diagram which shows the payment method implemented in the remote control device 1 (the remote control) of the data receiver 4 (the audiovisual programme receiver-decoder).

Step S1 corresponds to the state of the system prior to a payment transaction. The data receiver 4 receives the data representative of an audiovisual content from the content server 5. The data representative of an object for sale have also been received by the data receiver 4. The control unit of the data receiver 4 has processed these data and requests the user, by means of display on a display device connected to the receiver 4, to confirm the purchase of the object and to initialise a payment transaction.

Step S2 corresponds to the expectation of a payment confirmation action by the user. The remote control device is awaiting a user action intending to confirm or cancel initialisation of the payment. The action can be effected by pressing a key or by contact with a touch screen according to the input interface type of the control device 1. The user interface module 17 of the control device 1 detects the user's action. If the user cancels the payment transaction, the data receiver 4 cancels the purchase procedure and does not send information specific to or useful for the purchase of the object to the control device 1. If the user confirms the purchase of the object and therefore initialises a payment transaction, the receiver 4 transmits the payment information to the remote control device 1 which receives the information in step S3. The exchanges between the receiver 4 and device 1 use the communication interface 11 of device 1.

Device 1, on receipt of payment information and under control of its control and processing unit 13, sends in step S4 the data to the payment unit 2 via its NFC communication interface 12. This step relating to payment information transmission between device 1 and the payment unit 2 comprises the detection of the payment unit and the protocol exchanges specific to the matching of two items of equipment equipped with NFC technology.

The payment information, such as for example the object reference, its price and the payment destination are then transferred to the payment unit 2 which carries out the payment transaction by communicating with the remote payment transaction server 3.

Second Embodiment of the Invention

FIG. 4 shows the remote control device 1 (the remote control) according to a second embodiment of the invention.

According to the second embodiment of the invention, the remote control device 1 of the data receiver 4 comprises, in addition to the modules already described in the first embodiment, an electronic payment terminal module 18. The payment transaction can then be effected without using a connection via the GSM network between the payment unit 2 and the payment transaction server 3.

The functions of NFC technology enabling bank card emulation by the payment unit 2 are used. The EPT module 28 of the payment unit is not used. The steps for offering the purchase of an object are identical to those of the first embodiment.

A payment transaction according to the second embodiment of the invention is described below:

When the user effects a matching of the remote control and the smartphone, by bringing the two items of equipment within proximity of each other, the remote control 1 detects the smartphone 2 which functions in bank card emulation mode.

The payment transaction is then effected between the payment unit 2 of the remote control device 1 of the data receiver 4. According to the second embodiment of the invention, the EPT module 18 of the remote control device 1 executes the functions which are performed by the EPT module 28 of the first embodiment. Communication with the payment transaction server 3 is effected by means of the data receiver 4 and through the network 6.

This second embodiment is adapted to a data receiver which is interconnected with the content server 5 via a bidirectional network. In this case, the EPT module 18 of the remote control device 1 can communicate with the payment transaction server 3.

In contrast, and in the case of a unidirectional data broadcast network such as a digital terrestrial television (DTT) broadcast network or a satellite broadcast network, the first embodiment is more appropriate since the exchanges between the EPT 28 of the payment unit 2 pass via the communication network of GSM or EDGE type through the GSM communication interface 21 of the payment unit 2.

The invention is not limited to the embodiments previously described and relates to any remote control device of an item of equipment, adapted to operate as intermediate element in a payment transaction between a payment unit and the controlled equipment; the controlled equipment enabling the sale of an object to be offered to a user.

The invention claimed is:

1. A remote control device of a set-top box, said set-top box storing recorded data representative of an audiovisual content including information relating to a payment of an object and data representative of said object, the remote control device comprising a unit for configuring said set-top box for processing data representative of an audiovisual content, said remote control device comprising:

a user interface for initializing a payment transaction of said object presented in said audiovisual content, a first wireless communication interface for receiving, directly from said set-top box, said information relating to the payment of said object, a second wireless communication interface using a radio-frequency identification method for transmitting said payment information to a mobile remote payment unit positioned in proximity to said remote control device, said second wireless communication interface being compatible with a near field communication (NFC) standard and adapted to a near field communication.

2. The device according to claim 1 further comprising an electronic payment terminal module.

3. The device according to claim 1 further comprising a securing module for securing data transmitted by said first communication interface and said second communication interface.

4. A method for transmitting payment information for an object, said method comprising receiving, by a set-top box, data representative of an audiovisual content including data representative of said object, said data representative of the object comprising said payment information, said set-top box being controlled by a remote control device, said method comprising, in said remote control device:

initializing said payment, receiving said payment information directly from said set-top box, through a first wireless communication interface, transmitting said payment information to a mobile remote payment unit positioned in proximity to said remote control device through a second wireless communication interface, said second wireless communication interface using a radio-frequency identification RFID method for matching said remote control device and said remote payment unit, said second wireless communication interface being compatible with a near field communication (NFC) standard and adapted to a near field communication.

5. The method according to claim 4 wherein said remote payment unit is contained within a telecommunication device.

6. The method according to claim 4 wherein said telecommunication device comprises a smartphone module.

* * * * *